US009745537B2

(12) United States Patent
D'Addario et al.

(10) Patent No.: US 9,745,537 B2
(45) Date of Patent: *Aug. 29, 2017

(54) PROCESS FOR THE EXTRACTION OF LIPIDS FROM ALGAL BIOMASS

(75) Inventors: Ezio Nicola D'Addario, Monterotondo (IT); Edoardo D'Angeli, Rome (IT); Roberto Medici, Monterotondo (IT)

(73) Assignee: ENI S.p.A., Rome (IT)

( * ) Notice: Subject to any disclaimer, the term of this patent is extended or adjusted under 35 U.S.C. 154(b) by 1088 days.

This patent is subject to a terminal disclaimer.

(21) Appl. No.: 13/147,928

(22) PCT Filed: Jan. 28, 2010

(86) PCT No.: PCT/EP2010/000570
§ 371 (c)(1),
(2), (4) Date: Sep. 28, 2011

(87) PCT Pub. No.: WO2010/089063
PCT Pub. Date: Aug. 12, 2010

(65) Prior Publication Data
US 2012/0016145 A1 Jan. 19, 2012

(30) Foreign Application Priority Data
Feb. 4, 2009 (IT) .............................. MI2009A0144

(51) Int. Cl.
C11B 1/10 (2006.01)
C11C 3/00 (2006.01)
C11C 3/12 (2006.01)

(52) U.S. Cl.
CPC ........ *C11B 1/10* (2013.01); *C11C 3/00* (2013.01); *C11C 3/003* (2013.01); *C11C 3/12* (2013.01); Y02E 50/13 (2013.01)

(58) Field of Classification Search
CPC ......... Y02E 50/13; Y02E 50/10; Y02E 50/30; Y02E 50/17; C12N 9/16; C12N 15/79; C12P 7/6463; C12P 7/649; C12P 7/6418; C12P 7/64; C12P 7/6409; C12P 7/20; C12P 7/6427; C12P 33/00; C12P 7/6445; C12P 7/6472; Y02T 50/678; A61K 2300/00; A61K 31/19; A61K 31/20; A61K 31/231; A61K 38/465; A61K 8/64; A61K 38/55; A61K 8/66; A61K 2800/42; A61K 2800/522; A61K 2800/5922; A61K 8/0204; A61K 8/36; A61K 8/4926; A61K 8/4973; A61K 8/97; C10L 1/026; C10L 2200/0476; C10L 2270/026; C12Y 602/01003; C07C 69/52; A61Q 7/02; A61Q 17/04; A61Q 19/04; A61Q 19/10; A61Q 1/02

See application file for complete search history.

(56) References Cited

U.S. PATENT DOCUMENTS

| 4,341,038 A | 7/1982 | Bloch et al. | |
| 8,383,845 B2* | 2/2013 | Catchpole | C11B 1/10 554/20 |
| 8,535,397 B2* | 9/2013 | D'Addario | C11B 1/10 435/134 |
| 2004/0009261 A1* | 1/2004 | Brody | A23C 9/1209 426/34 |
| 2008/0155888 A1* | 7/2008 | Vick et al. | 44/308 |
| 2011/0179699 A1 | 7/2011 | D'Addario et al. | |

FOREIGN PATENT DOCUMENTS

| EP | 0 424 915 | 5/1991 |
| JP | 55 013218 | 1/1980 |

OTHER PUBLICATIONS

Ogino (Ch. VII, "Organic Solvent-Stable Enzymes", p. 193-206, Protein Adaptation in Extremophiles, Ed. Siddiqui and Thomas, 2008).*
Modi et al. (Bioresource Technology, vol. 98, No. 6, p. 1260-1264, 2007).*
Yunus et al. (Proceedings of the 1st International Conference on Natural Resources Engineering & Technology, Putrajaya, Malaysia, p. 671-678, 2006).*
Demirbas et al. (Fuel Processing Technology, vol. 88, p. 591-597, 2007).*
Chisti et al. (Trends in Biotechnology, vol. 26, No. 3, p. 126-131, 2008).*
Douglas, A.G., et al., "The Fatty Acids of the Alga *Botryococcus Braunii*," Phytochemistry, vol. 8, pp. 285-293, (1969) XP 026617911.
Shizuri, Y., et al., "Laurequinone, A Cyclolaurane Sesquiterpene From the Red Alga *Laurencia Nidifica*," Phytochemistry, vol. 23, No. 11, pp. 2672-2673, (1984) XP 026621369.
Shigeki, H., "Concentration of technetium-99 in marine environment," Hoshasen Igaku Sogo Kenkyusho, [Report] NIRS-M , NIRS-M-93 (Kankyo to Koshu No Anzen No Tameno Apurochi) pp. 23-31, (1996) (English Abstract only).
International Search Report issued Jun. 23, 2010 in PCT/EP10/000570 filed Jan. 28, 2010.

* cited by examiner

*Primary Examiner* — Debbie K Ware
(74) *Attorney, Agent, or Firm* — Oblon, McClelland, Maier & Neustadt, L.L.P.

(57) ABSTRACT

A process for the extraction of lipids from algal biomass comprising: —producing an aqueous suspension of algal biomass; —adding to said aqueous suspension of algal biomass at least one organic solvent immiscible or substantially immiscible with water obtaining an organic-aqueous mixture; —subjecting said organic-aqueous mixture to evaporation of water and lipid extraction, operating at a temperature such to obtain the substantial complete removal of the water from said organic-aqueous mixture, obtaining: (i) an organic phase comprising lipids and said organic solvent; (ii) a semi-solid phase comprising a residue of said algal biomass.

20 Claims, 1 Drawing Sheet

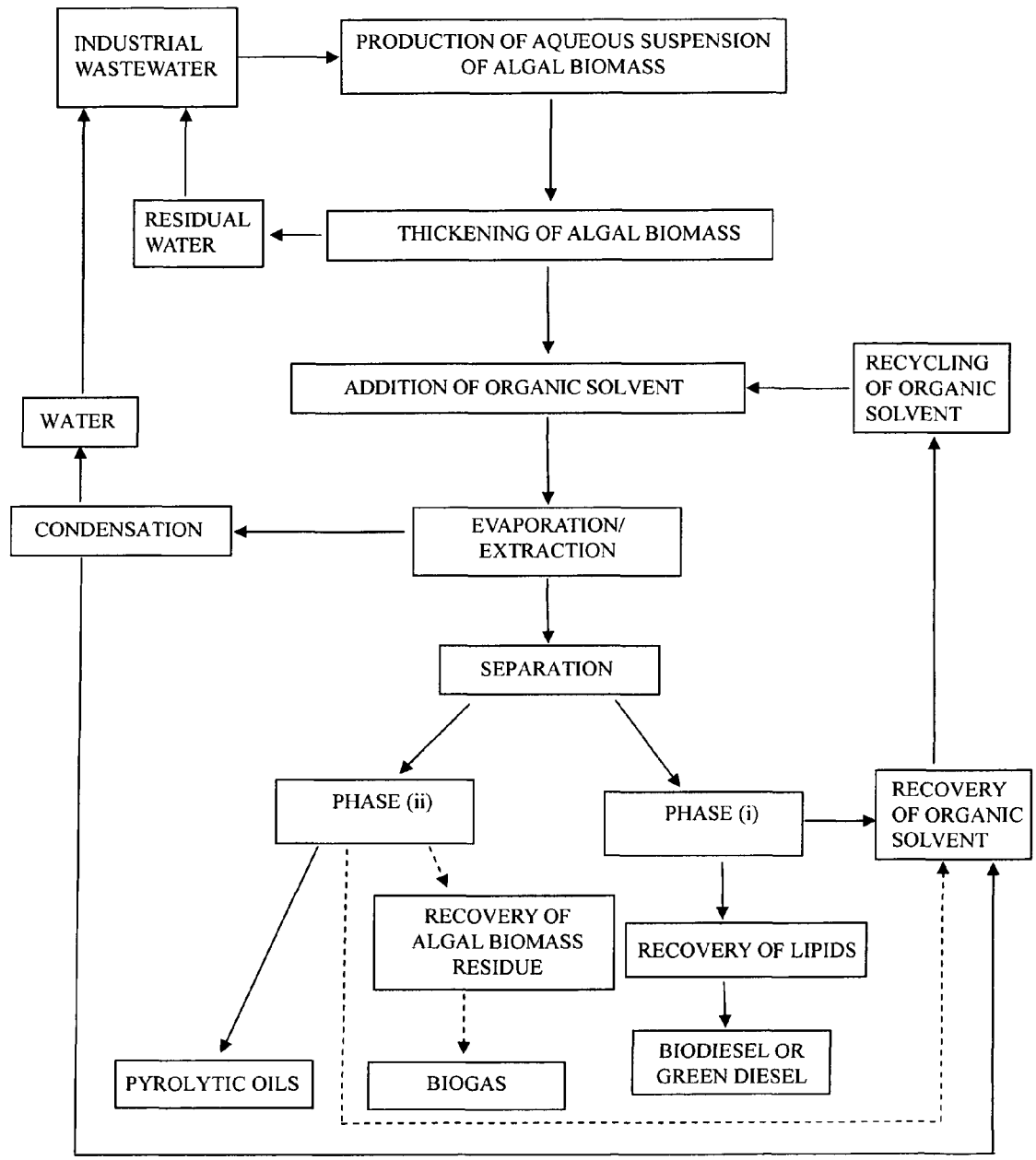

PROCESS FOR THE EXTRACTION OF LIPIDS FROM ALGAL BIOMASS

CROSS REFERENCES TO RELATED APPLICATIONS

This application is a 371 of International Patent Application No. PCT/EP2010/000570, filed on Jan. 28, 2010, and claims priority to Italian Patent Application No. MI2009A000144, filed on Feb. 4, 2009.

The present invention relates to a process for the extraction of lipids from algal biomass.

More specifically, the present invention relates to a process for the extraction of lipids from algal biomass which comprises treating an aqueous suspension of algal biomass with at least one organic solvent immiscible or substantially immiscible with water obtaining an organic-aqueous mixture and subjecting said organic-aqueous mixture to evaporation of water and lipid extraction.

Algae, in particular microalgae, are currently cultivated for the production of valuable compounds such as, for example, polyunsaturated fatty acids [for example, eicosapentaenoic acid (EPA), docosahexaenoic acid (DHA), and the like], vitamins (for example, (β-carotene, and the like) and gelling agents, which are included in the nutritional, pharmaceutical and cosmetic fields.

The cultivation of microalgae for the above fields is characterized by rather limited production capacities (in the order of hundreds-thousands of tons per year) and by a high added value of the compounds obtained (hundreds-thousands of dollars per kilogram). This is why complex and expensive production systems, particularly extraction and purification systems, which must satisfy strict regulations of the sanitary and nutritional type, typical of the above-mentioned fields, can be tolerated.

The shift from the above-mentioned fields, wherein the microalgae are traditionally used, to the environmental/energy field, requires the development of technologies which lead to considerable increases in the production capacity (from hundreds-thousands of tons per year to millions of tons per year) and to a large reduction in the production costs due to the limited added value of the products destined for the environmental/energy field (hundreds-thousands of dollars per ton).

Processes relating to the extraction of compounds from algal biomasses are described in the art.

The U.S. Pat. No. 4,341,038, for example, describes a process for the recovery of oily products from algae comprising: (a) growing unicellular halophilic algae, without a cellular wall, in a saline solution; (b) collecting these algae in order to obtain a slurry based on algae and saline water; (c) extracting the oily products from said slurry using a solvent for said products; (d) recovering said oily products and residual algae. Said oily products can be used as energy sources, in particular fuel, or as sources of other products such as, for example, fertilizers, or for animal nutrition.

U.S. Pat. No. 5,338,673 describes a process for the selective production of polyunsaturated fatty acids from a culture of microalgae of the species *Porphyridium cruentum*, as well as a process for their extraction. In particular, the extraction process comprises: concentrating the algal biomass; subjecting said concentrated algal biomass to cell lysis, preferably by means of mechanical homogenization; separating the liquid phase from the solid phase, said solid phase containing said polyunsaturated fatty acids; extracting said polyunsaturated fatty acids using an organic solvent such as, for example, hexane or chloroform; evaporating said organic solvent in order to obtain said polyunsaturated fatty acids. Said polyunsaturated fatty acids, such as, for example, eicosapentaenoic acid (EPA), docosahexaenoic acid (DHA), arachidonic acid, are particularly used in the pharmaceutical field.

U.S. Pat. No. 5,539,133 describes a method for obtaining lipids with a high quantity of polyunsaturated fatty acids having from 20 to 22 carbon atoms, through the extraction from a raw material of animal or vegetable origin, said raw material having a water content of 5% by weight to 50% by weight and a particle-size of 0.01 mm to 50 mm, said extraction being carried out using an organic solvent, preferably miscible with water (e.g., ethanol) or through liquefied compressed gas (e.g., carbon dioxide, propane, or mixtures thereof). As raw material which can be used for this purpose, unicellular algae (microalgae), or macroalgae belonging to the family of red, brown o green algae, are also suitable. Said polyunsaturated fatty acids such as, for example, docosahexaenoic acid (DHA), arachidonic acid, are particularly used in the food industry.

U.S. Pat. No. 6,166,231 describes a process for separating lipids, in particular food oils, from a material of a biological origin (e.g., algae, yeast or bacteria) which comprises: (a) putting a solvent (e.g., hexane or various petroleum ethers) in contact with an aqueous suspension of the material of a biological origin containing lipids in countercurrent, said solvent being essentially immiscible with water; (b) collecting the solvent, said solvent containing the lipids extracted from said aqueous suspension of the material of a biological origin; and (c) separating the lipids from said solvent. Said aqueous suspension of the material of a biological origin is preferably subjected to centrifugation in order to reach a concentration of solid matter in the suspension not higher than 50%, and, subsequently, to cell lysis by means of mechanical homogenization, for example. An improved extraction of the lipids can be obtained through an increase in the pH, preferably from 5 to 10, of said material of a biological origin through methods known in the art, such as, for example, by the addition of a caustic solution (e.g., potassium hydroxide or sodium hydroxide). The increase in the pH also prevents the formation of emulsions between the material of a biological origin and the solvent.

Miao X. et al., describe the production of biodiesel from algae in the following article: "Biodiesel production from heterotrophic microalgal oil", published in "Bioresource Technology" (2006), 97, pg. 841-846. In said article, algae of the species *Chlorella protothecoides*, heterotrophic grown, are dried and subsequently pulverized in a mortar and subjected to extraction with hexane in order to extract the oil. The extracted oil is subsequently subjected to acid transesterification in the presence of methanol and sulphuric acid as transesterification catalyst, in order to obtain biodiesel.

The production of biodiesel from algae is also described by Hossain S. et. al., in the following article: "Biodiesel Fuel Production from Algae as Renewable Energy", published in "American Journal of Biochemistry and Biotechnology" (2008), 4 (3), pg. 250-254. In said article, algae of the species *Oedogonium* and *Spirogyra*, after being ground and chopped as much as possible, are dried in a thermostatic oven at 80° C., for 20 minutes, for the purpose of eliminating the water. Subsequently, a solution of hexane and ether is mixed with the dried algae to extract the oil. The oil extracted is recovered by means of vacuum evaporation from said hexane and ether solution. The transesterification reaction of the oil thus obtained, for the purpose of obtaining biodiesel, is carried out in the presence of a mixture of sodium hydroxide as transesterification catalyst, and methanol (base transesterification).

The above processes, however, can have various critical points, such as, for example:
cell lysis of the biomass normally carried out by mechanical homogenization, grinding or pulverization, so as to liberate the intra- and endo-cellular lipid fractions and to improve the contact with the solvent;
drying of the biomass normally carried out by means of costly techniques, such as, for example, spray-drying or lyophilization, an operation which also requires particular attention with respect to the temperature used during the drying which must be kept within a certain range in order not to jeopardize the quality of the compounds (e.g., lipids) to be extracted;
aggregation phenomena of the residual biomass after drying which can reduce the extraction yield;
difficult separation of the aqueous phase from the solvent phase containing the lipid fractions, an operation which can be particularly difficult due to the formation of emulsions and foams.

The Applicant has now found that the extraction of lipids from algal biomass can be advantageously carried out by means of a process which comprises treating an aqueous suspension of algal biomass with at least one organic solvent immiscible or substantially immiscible with water, obtaining an organic-aqueous mixture and subjecting said organic-aqueous mixture to evaporation of water and lipid extraction. This process allows the following phases to be obtained, without any further interventions: (i) an organic phase comprising lipids and said organic solvent; (ii) a semisolid phase comprising a residue of the algal biomass. This process also allows both the evaporation of water from the algal biomass and the lipid extraction to be simultaneously carried out, thus avoiding both phenomena due to the formation of emulsions and foams and aggregation phenomena of the residual algal biomass. This process also enables the heat contained in the vapours produced during the evaporation to be recovered, in particular when multistage evaporators are adopted, with a consequent energy saving. Furthermore, this process can be carried out at a non-high temperature (e.g., lower than or equal to 100° C.), consequently not negatively influencing the quality of the lipids extracted.

An object of the present invention therefore relates to a process for the extraction of lipids from algal biomass comprising:
producing an aqueous suspension of algal biomass;
adding to said aqueous suspension of algal biomass at least one organic solvent immiscible or substantially immiscible with water obtaining an organic-aqueous mixture;
subjecting said organic-aqueous mixture to evaporation of water and lipid extraction, operating at a temperature such to obtain the substantial complete removal of the water from said organic-aqueous mixture, obtaining:
(i) an organic phase comprising lipids and said organic solvent;
(ii) a semi-solid phase comprising a residue of said algal biomass.

The lipid fraction present in the algal biomass deriving from the cultivation of microalgae generally comprises various groups of lipid molecules, such as, for example: glycerides, for example, mono-, di-, tri-acylglycerides (which contain fatty acids); waxes (which contain fatty acids plus alcohols and fatty acids plus sterols); hydrocarbons; free fatty acids; sterols; phospholipids, such as, for example, diacyl-phosphoglycerides, alkyl-acyl-phospholipids, alkenyl-acyl-phosphoglycerides (which contain fatty acids plus phosphoric group), sphingophospholipids (which contain fatty acids plus phosphoric group and nitrogenous base); glycolipids (which contain fatty acids plus carbohydrates and nitrogenated base); aminolipids (which contain fatty acids and nitrogenous base). In addition to these lipid molecules, other hydrophobic organic compounds, such as, for example, phytol, and other long-chain hydrophobic alcohols, chlorophylls, carotenoids, terpenes, tocopherols, are generally present in said algal biomass.

The above-mentioned lipid fraction and said other hydrophobic organic compounds are normally extracted by means of solvents, operating according to processes known in the art, such as, for example, those described in the documents indicated above.

As already mentioned above, the process object of the present invention allows both the evaporation of water from the algal biomass and the lipid extraction to be carried out simultaneously, thus avoiding both phenomena due to the formation of emulsions and foams and aggregation phenomena of the residual algal biomass. Said process therefore allows a simpler extraction of the lipids with respect to the known processes with a consequent saving of time and costs.

The organic phase (i) preferably comprises, in addition to lipids, hydrophobic organic compounds different from lipids such as, for example, phytol and other long-chain hydrophobic alcohols, chlorophylls, carotenoids, terpenes, tocopherols.

The aqueous suspension of algal biomass preferably derives from the cultivation of algae, preferably unicellular (microalgae), carried out on wastewaters coming from industrial wastewaters. In this case, the algal cultivation metabolizes the substances containing nitrogen and/or phosphorous contained therein contributing to their purification. The $CO_2$ contained in industrial combustion gases (refinery plants, thermoelectric plants, hydrogen generation plants, etc.) can be used as the $CO_2$ necessary for algal growth.

The aqueous suspension of algal biomass is preferably subjected to thickening to obtain a higher concentration of dry matter in said algal biomass. Said thickening can be carried out by means of various processes, such as, for example:
gravitational separation in sedimentary tanks typically used in water treatment plants;
vacuum filtration;
treatment using filter presses or belt presses.

The sedimentation of algal strains of fresh water such as, for example, the strain *Scenedesmus* sp, can be facilitated by the use of cationic polyelectrolytes (e.g., polyacrylamides) used in quantities of 2 ppm-5 ppm (transition of the algal concentration from 0.4 g/l to 40 g/l-50 g/l in a few hours).

For the purposes of the present description and of the following claims, the definition of the numerical ranges always comprises the extremes, unless otherwise specified.

According to a preferred embodiment of the present invention, the aqueous suspension of algal biomass has a concentration of dry matter ranging from 2% by weight to 40% by weight, more preferably from 4% by weight to 25% by weight, with respect to the total weight of the aqueous suspension of algal biomass.

The water released from the thickening of the aqueous suspension of algal biomass generally has a reduced content of nitrogenated and/or phosphoric polluting substances and can be discharged directly, or it can be subjected to finishing purification treatments before being discharged in order to be able to reach the law specifications.

If the water available for the cultivation of algae is not sufficient, the water released from the thickening of the algal biomass can be for the most part recovered and re-used in the above process as industrial wastewater.

For the purposes of the present invention and of the following claims, the term "organic solvent immiscible with water" refers to an organic solvent which has a solubility in distilled water, at 25° C., lower than or equal to 0.1 g/100 ml of distilled water.

For the purposes of the present invention and of the following claims, the term "organic solvent substantially immiscible with water" refers to an organic solvent which has a solubility in distilled water, at 25° C., lower than or equal to 10 g/100 ml of distilled water, preferably ranging from 0.5 g/100 ml of distilled water to 9 g/100 ml of distilled water.

According to a preferred embodiment of the present invention, the organic solvent immiscible with water can be selected from: aliphatic hydrocarbons, said aliphatic hydrocarbons having a boiling point higher than 100° C., preferably ranging from 120° C. to 160° C., such as, for example, n-octane, nonane, decane, or mixtures thereof; aromatic hydrocarbons, such as for example, isomers of xylene, toluene, benzene, chlorobenzene, or mixtures thereof; refinery cuts comprising: (a) mixtures of said aliphatic hydrocarbons, said mixtures having a boiling point higher than 100° C., preferably ranging from 120° C. to 160° C., (b) mixtures of said aromatic hydrocarbons, (c) mixtures of said aliphatic and aromatic hydrocarbons; or mixtures thereof. N-octane, xylene, or mixtures thereof, are preferred.

According to a preferred embodiment of the present invention, the organic solvent substantially immiscible with water can be selected from: esters such as, for example, ethyl acetate, isopropyl acetate, n-butyl acetate, or mixtures thereof; ketones having a boiling point higher than 100° C. such as, for example, pentanone, hexanone, or mixtures thereof; or mixtures thereof. Ethyl acetate is preferred.

According to a preferred embodiment of the present invention, the ratio between the concentration of dry matter in the aqueous suspension of algal biomass and the volume of organic solvent ranges from 1:1 to 1:80, preferably from 1:3 to 1:70.

According to a preferred embodiment of the present invention, the evaporation of water and lipid extraction can be carried out:

at atmospheric pressure, at 100° C., if the boiling point of said organic solvent is higher than 100° C.; or at the boiling point of the low-boiling azeotrope, if said organic solvent forms a low-boiling azeotrope with water.

It should be pointed out that, for the purposes of the present invention, if said organic solvent does not form a low-boiling azeotrope with water, it must be selected from organic solvents having a boiling point higher than 100° C.

According to a preferred embodiment of the present invention, the evaporation of water and lipid extraction can be carried out for a time ranging from minutes to 5 hours, preferably ranging from 1.5 hours to 3.5 hours.

The evaporation of water and lipid extraction can be advantageously carried out in evaporators known in the art such as, for example, single-stage evaporators or multistage evaporators. Multistage evaporators are preferred.

The water vapour leaving the evaporator is preferably sent to a condenser to obtain water which can be recovered and re-used in the above process. The condensation of the vapours optionally produced from a part of the organic solvent can also take place in said condenser. Said vapours optionally produced from a part of the organic solvent are released together with the water vapours from said organic-aqueous mixture during the evaporation of water and lipid extraction, consequently causing the removal of part of the organic solvent. During the evaporation of water and lipid extraction, a quantity of organic solvent is preferably removed, not higher than 20% by weight, preferably ranging from 5% by weight to 10% by weight, with respect to the total quantity of organic solvent used (i.e. total quantity of solvent added to the thickened algal biomass). The condensed organic solvent can be recovered and re-used in the above process.

If an organic solvent which forms an azeotrope with water is used, the condensation of the vapours and the subsequent demixing of the azeotrope into water and solvent take place in said condenser, thus, also in this case, allowing the recovery and re-use of the water and solvent in said process. In the azeotrope, there is preferably a quantity of organic solvent not higher than 30% by weight, preferably from 5% by weight to 20% by weight, with respect to the total quantity of organic solvent used (i.e. total quantity of solvent added to the thickened algal biomass).

For the purposes of the present invention and of the following claims, the term "substantial complete removal of the water" means that at the end of the evaporation of water and lipid extraction, in said phases (i) and (ii) a quantity of water can be present which is lower than or equal to 2% by weight, preferably lower than or equal to 1% by weight, more preferably lower than or equal to 0.1% by weight, with respect to the total weight of said phases (i) and (ii). The quantity of residual water is generally determined by measuring the volume of water which condenses in the condenser after evaporation.

At the end of the evaporation, the above phases (i) and (ii) are obtained, which are separated by gravity. Said phases (i) and (ii) are subsequently recovered and subjected to treatments known in the art in order to obtain the compounds of interest.

It should be noted that the above phases (i) and (ii) are easily separated by gravity without the necessity for any particular separation treatment.

The organic phase (i) comprising lipids and organic solvent is preferably subjected to evaporation in order to recover the organic solvent which can be re-used in the above process and the lipids extracted. After evaporation of the organic solvent, the lipids extracted can be subjected to esterification in the presence of an alcohol having from 1 to 4 carbon atoms, preferably methanol, ethanol, and of a catalyst, preferably an acid catalyst, in order to produce glycerol and alkyl esters, in particular methyl esters or ethyl esters (biodiesel).

Alternatively, after evaporation of the organic solvent, the lipids extracted can be subjected to hydrogenation/deoxygenation in the presence of hydrogen and of a catalyst in order to produce green diesel. Hydrogenation/deoxygenation processes are known in the art and are described, for example, in European patent application EP 1,728,844.

Alternatively, said organic phase (i) comprising lipids and organic solvent can be directly subjected to esterification, or to hydrogenation/deoxygenation. In this case, the evaporation step of the organic solvent is thus avoided.

The biodiesel or green diesel which are produced as described above can be used as such or in a mixture with other fuels for motor vehicles.

The semisolid phase (ii) comprising a residue of the algal biomass, i.e. residual algal biomass soaked in the organic solvent, is preferably subjected to pyrolysis in order to obtain pyrolytic oils. The organic solvent is preferably present in said semisolid phase (ii) in a quantity not higher than 10% by weight, preferably ranging from 2% by weight to 8% by weight, with respect to the total quantity of solvent used (i.e. total quantity of solvent added to the thickened algal biomass). Alternatively, before being subjected to pyrolysis, said semisolid phase (ii) can be subjected to removal of the organic solvent which can be carried out as described below.

Alternatively, said semisolid phase (ii) can be subjected to anaerobic digestion by means of micro-organisms in the absence of oxygen in order to obtain biogas.

It should be pointed out that, in the case of the production of biogas, the semisolid phase (ii) has to be subjected to removal of the organic solvent which can be carried out by means of techniques known in the art such as, for example, washing with fresh solvent and subsequent drying in a thermostat-regulated oven or in industrial driers, filtration, or evaporation. After removal of the organic solvent, the residue of algal biomass which is obtained can be resuspended in water in order to obtain an aqueous suspension of algal biomass to be subjected to anaerobic digestion. The organic solvent recovered can be re-used in said process.

The present invention is now illustrated in greater detail by means of an illustrative form with reference to FIG. 1 provided hereunder.

According to a typical embodiment of the process of the present invention, the aqueous suspension of the algal biomass is produced through algae cultivation, preferably microalgae, carried out on wastewaters coming from industrial wastewaters. The production of microalgae can be suitably carried out, for example, by combining cultivation systems such as photoreactors and "open ponds".

The aqueous suspension of algal biomass thus obtained is thickened by gravitational separation.

The water released from the thickening, generally having a reduced content of nitrogenated and/or phosphoric polluting substances, can be discharged directly or subjected to finishing purification treatments before being discharged, in order to be able to comply with the law specifications (not shown in FIG. 1).

If the water available for the algae cultivation is not sufficient, the water released from the thickening of the algal biomass can be recycled to a large extent and re-used in the above process as industrial wastewater (as shown in FIG. 1).

The thickened algal biomass is preferably fed to an evaporation system, preferably a multistage evaporator (not shown in FIG. 1).

The following products are then fed to said evaporation system:
  an aqueous suspension of thickened algal biomass having a variable content of dry matter, preferably from 2% by weight to 40% by weight with respect to the total weight of the aqueous suspension of algal biomass;
  an organic solvent immiscible or substantially immiscible with water, preferably n-octane, xylene, or ethyl acetate.

Said evaporation system, maintained at atmospheric pressure, is brought to 100° C. if the solvent has a boiling point higher than 100° C., or to the boiling point of the low-boiling azeotrope if the solvent forms a low-boiling azeotrope with water. Said temperature is maintained constant by means of an automatic temperature control system which forms part of the evaporation system.

The water vapour leaving the evaporation system is sent to a condenser (not shown in FIG. 1) obtaining water which can be recovered and re-used in the cultivation process of algae from which the aqueous suspension of algal biomass is obtained (as shown in FIG. 1).

The condensation of the organic solvent also takes place in said condenser, which is partly removed from said organic-aqueous mixture during the evaporation of water and lipid extraction. Said solvent can be recovered and re-used in the above process (as shown in FIG. 1).

At the end of the evaporation (the substantial complete removal of the water is verified by the fact that there is no longer condensation of the water in the condenser) and lipid extraction (the end of the lipid extraction is verified by means of gas-chromatographic analysis), phases (i) and (ii) are separated by gravity. Said phases (i) and (ii) are preferably subjected to the treatments described above in order to obtain: pyrolytic oils, biodiesel or green diesel, biogas.

Phase (i) is preferably subjected to evaporation to recover the organic solvent which can be re-used in the above process and the lipids extracted which can be subjected to the treatments indicated above in order to obtain biodiesel or green diesel (as shown in FIG. 1).

Phase (ii) can be subjected to pyrolysis to obtain pyrolytic oils (as shown in FIG. 1).

Alternatively, phase (ii) can be subjected to removal of the organic solvent by means of the techniques described above (for example, washing with fresh solvent and subsequent drying in a thermostat-regulated oven or in industrial driers, filtration or evaporation). After removal of the organic solvent, the residue of algal biomass can be resuspended in water in order to obtain an aqueous suspension of algal biomass which can be subjected to anaerobic digestion to obtain biogas, whereas the organic solvent can be recovered and re-used in the above process (as shown by the dashed lines in FIG. 1).

Some illustrative and non-limiting examples are provided for a better understanding of the present invention and for its embodiment.

EXAMPLE 1

Preparation of the Algal Biomass

In the following examples 2-7 the algal strain *Scenedesmus* sp., of internal collection, which normally grows in fresh water, was used. The cultivation process adopted is described hereunder.

The inoculum to be introduced into the growth tank described hereunder, was prepared as follows:
  a sample of monoalgal culture previously preserved at −85° C. in a 10% glycerine solution, was defrosted leaving it at room temperature, it was then subjected to centrifugation to remove the supernatant, obtaining a cellular paste;
  the cellular paste thus obtained was inoculated into three 250 ml flasks containing 50 ml of solution comprising nutrients, obtaining an algal culture;

said algal culture was grown in an illuminated climatic chamber at a constant temperature of 30° C., in the presence of $CO_2$ at 0.5% in air;

after about a week, the flask reached concentration of 0.3 g/l, this culture was used as inoculum for three 1 liter flasks containing 500 ml of solution comprising nutrients and placed in the climatic chamber;

after 2 days the culture had a concentration of 0.5 g/l and this culture was used as inoculum for a laboratory growth tank having a volume of 35 liters.

reduction of the content of $MgSO_4.7H_2O$ from 2.5 g/l to 1.5 g/l;

reduction in the operating pH from 7.8 to 7.0.

Three samples of tank culture were taken and subjected to optical density measurements, at a wave-length of 750 nm, by means of a Varian C 900 spectrophotometer in order to be able to follow the algal growth trend.

In addition to this measurement, dry weight measurements were carried out to determine the effective concentration reached by the cultures. Table 1 summarizes the results obtained (triplicate values).

TABLE 1

| Time (hrs) | Optical density (750 nm) | | | | | | | | | Dry weight (g/l) |
|---|---|---|---|---|---|---|---|---|---|---|
| | 0 | 3 | 5 | 20.5 | 24 | 29 | 44.5 | 48 | 52 | |
| | 0.415 | 0.500 | 0.570 | 1.550 | 1.840 | 2.200 | 2.850 | 3.180 | 3.350 | 0.835 |
| | 0.670 | 0.760 | 0.830 | 1.500 | 1.550 | 1.720 | 2.300 | 2.410 | 2.540 | 0.925 |
| | 0.510 | 0.570 | 0.620 | 1.330 | 1.250 | 1.460 | 1.900 | 1.980 | 2.060 | 0.580 |

The inoculum, prepared as described above, was grown in the culture medium M4N, described in literature for the cultivation of microalgae. The growth conditions were the following:
Water: drinkable;
$KNO_3$: 5.0 g/l;
$KH_2PO_4$: 1.25 g/l;
$CaCl_2$: 0.01 g/l;
$FeSO_4.7H_2O$: 0.003 g/l;
$MgSO_4.7H_2O$: 2.5 g/l;
Microelements: 1 ml/l of the following solution: 2.86 g of $H_3BO_3$, 1.81 g of $MnCl_2.4H_2O$, 80 mg of $CuSO_4.5H_2O$, 220 mg of $ZnSO_4.7H_2O$, 210 mg of $Na_2MoO_4$, 25 g of $FeSO_4.7H_2O$, 33.5 g of EDTA and 1 drop of concentrated $H_2SO_4$ per liter;
operating pH: 7.8.

Inoculum tank: 10% by volume of the above culture in M4N medium.

The tank was illuminated from the outside by means of 17,500 Lux tungsten lamps and was maintained at 28° C. by means of thermostat-regulated water circulation. The tank was also fed with a mixture of air and $CO_2$ at 10% in air, at a flow-rate of 200 liters/hour, under a pH control (pH set point 7.0).
Culture Medium Tank (Optimized M4N):
Water: drinkable;
$KNO_3$: 1.5 g/l;
$KH_2PO_4$: 1.25 g/l;
$K_2HPO_4$: 0.1 g/l;
$CaCl_2$: 0.01 g/l;
$FeSO_4.7H_2O$: 0.003 g/l;
$MgSO_4.7H_2O$: 1.5 g/l;
Microelements: 1 ml/l of the following solution: 2.86 g of $H_3BO_3$, 1.81 g of $MnCl_2.4H_2O$, 80 mg of $CuSO_4.5H_2O$, 220 mg of $ZnSO_4.7H_2O$, 210 mg of $Na_2MoO_4$, 25 g of $FeSO_4.7H_2O$, 33.5 g of EDTA and 1 drop of concentrated $H_2SO_4$ per liter;
operating pH: 7.0.

When shifts of ±0.2 units were observed with respect to pH 7.0, the $CO_2$ flow was manually modified.

The composition indicated above was obtained by modifying the typical culture medium M4N described in literature for the cultivation of microalgae. In particular, the modifications carried out are:
reduction of the $KNO_3$ content from 5.0 g/l to 1.5 g/l;
addition of $K_2HPO_4$ in a quantity of 0.1 g/l;

The algal biomass obtained was centrifuged in a disk centrifuge of the Alfa Laval type obtaining an aqueous suspension of algal biomass having a volume of about 2 liters (concentration of dry matter 10 g/liter).

The aqueous suspension of algal biomass was then subjected to filtration under vacuum until a concentration of dry matter was obtained, varying from 5% by weight to 20% by weight with respect to the total weight of the aqueous suspension of algal biomass.

The samples obtained were preserved in a refrigerator before being subjected to lipid extraction.

EXAMPLE 2

Lipid Extraction (Concentration of Dry Matter Equal to 5%, Solvent n-Octane)

50 ml of n-octane were added to a three-necked 500 ml flask, equipped with a Marcusson Dean-Stark distillation apparatus, containing 100 g of an aqueous suspension of algal biomass of algae of the strain *Scenedesmus* sp. obtained as described in Example 1, having a concentration of dry matter equal to 5% by weight with respect to the total weight of the aqueous suspension of algal biomass (ratio concentration of dry matter in the aqueous suspension of algal biomass:volume solvent equal to 1:10).

The flask, maintained at atmospheric pressure, was brought by means of a heating jacket to 100° C. and was kept, under stirring, at this temperature, for 3 hours.

After 3 hours, the stirring was stopped, the flask was brought back to room temperature (25° C.) and the two phases were left to separate by gravity.

The organic phase, about 50 ml comprising n-octane and lipids, was recovered by removing it directly from the flask.

The semisolid phase remaining in the flask was washed with n-octane (50 ml) and dried in a thermostat-regulated oven at 80° C., obtaining a residue of dried algal biomass.

The starting algal biomass, as well as the residue of dried algal biomass, were subjected to determination of the total lipids by modifying the spectrophotometric method described by Marsch J. B. and Weistein D. B. in "Journal of Lipid Research" (1996), Vol. 7, pages 574-576.

For this purpose, 2 mg of starting algal biomass or of residue of dried algal biomass, were suspended in a ml test-tube, in 4.5 ml of a chloroform:methanol solution in a ratio of 1:2 (v/v). The test-tube was placed in an ultrasound bath (NEY Ultrasonik 104H) for 15 minutes, and subsequently in an ice bath for 5 minutes. 1.5 ml of chloroform and 1.5 ml of water were then added, obtaining an aqueous phase comprising methanol and an organic phase comprising chloroform and the extracted lipids. Said organic phase was transferred to a 10 ml test-tube and the chloroform was evaporated operating under a nitrogen flow.

After evaporation of the chloroform, 2 ml of concentrated sulphuric acid were added. The test-tube was heated to 200° C., left at this temperature for 15 minutes, and rapidly brought back to room temperature (25° C.) by placing the test-tube in an ice bath. After 5 minutes in ice, 3 ml of deionized water were added, the test-tube was stirred and subsequently placed in ice for a further 5 minutes.

The sample thus obtained was subjected to optical density measurement, at a wave-length equal to 375 nm using a Philips spectrophotometer mod. PU8625. The concentration of the lipids is obtained by interpolation taking as reference the values of the standard obtained by dissolving palmitin in chloroform at different concentrations: 100 μg/ml, 200 μg/ml and 300 μg/ml.

The results obtained are indicated in Table 2.

EXAMPLE 3

Lipid Extraction (Concentration of Dry Matter Equal to 10%, Solvent n-Octane)

50 ml of n-octane were added to a three-necked 500 ml flask, equipped with a Marcusson Dean-Stark distillation apparatus, containing 50 g of an aqueous suspension of algal biomass of algae of the strain *Scenedesmus* sp. obtained as described in Example 1, having a concentration of dry matter equal to 10% by weight with respect to the total weight of the aqueous suspension of algal biomass (ratio concentration of dry matter in the aqueous suspension of algal biomass:volume solvent equal to 1:10).

The flask, maintained at atmospheric pressure, was brought by means of a heating jacket to 100° C. and was kept, under stirring, at this temperature, for 2.5 hours.

After 2.5 hours, the stirring was stopped, the flask was brought back to room temperature (25° C.) and the two phases were left to separate by gravity.

The organic phase, about 50 ml, comprising n-octane and lipids, was recovered by removing it directly from the flask.

The semisolid phase remaining in the flask was washed with n-octane (50 ml) and dried in a thermostat-regulated oven at 80° C., obtaining a residue of dried algal biomass.

The starting algal biomass, as well as the residue of dried algal biomass, were subjected to determination of the total lipids operating as described in Example 2: the results obtained are indicated in Table 2.

EXAMPLE 4

Lipid Extraction (Concentration of Dry Matter Equal to 20%, Solvent n-Octane)

100 ml of n-octane were added to a three-necked 500 ml flask, equipped with a Marcusson Dean-Stark distillation apparatus, containing 50 g of an aqueous suspension of algal biomass of algae of the strain *Scenedesmus* sp. obtained as described in Example 1, having a concentration of dry matter equal to 20% by weight with respect to the total weight of the aqueous suspension of algal biomass (ratio concentration of dry matter in the aqueous suspension of algal biomass:volume solvent equal to 1:10).

The flask, maintained at atmospheric pressure, was brought by means of a heating jacket to 100° C. and was kept, under stirring, at this temperature, for 3 hours.

After 3 hours, the stirring was stopped, the flask was brought back to room temperature (25° C.) and the two phases were left to separate by gravity.

The organic phase, about 100 ml, comprising n-octane and lipids, was recovered by removing it directly from the flask.

The semisolid phase remaining in the flask was washed with n-octane (100 ml) and dried in a thermostat-regulated oven at 80° C., obtaining a residue of dried algal biomass.

The starting algal biomass, as well as the residue of dried algal biomass, were subjected to determination of the total lipids operating as described in Example 2: the results obtained are indicated in Table 2.

EXAMPLE 5

Lipid Extraction (Concentration of Dry Matter Equal to 10%, Solvent Xylene)

50 ml of xylene were added to a three-necked 500 ml flask, equipped with a Marcusson Dean-Stark distillation apparatus, containing 50 g of an aqueous suspension of algal biomass of algae of the strain *Scenedesmus* sp. obtained as described in Example 1, having a concentration of dry matter equal to 10% by weight with respect to the total weight of the aqueous suspension of algal biomass (ratio concentration of dry matter in the aqueous suspension of algal biomass:volume solvent equal to 1:10).

The flask, maintained at atmospheric pressure, was brought by means of a heating jacket to 92° C. (boiling point of the low-boiling azeotrope) and was kept, under stirring, at this temperature, for 3 hours.

After 3 hours, the stirring was stopped, the flask was brought back to room temperature (25° C.) and the two phases were left to separate by gravity.

The organic phase, about 50 ml, comprising xylene and lipids, was recovered by removing it directly from the flask.

The semisolid phase remaining in the flask was washed with xylene (50 ml) and dried in a thermostat-regulated oven at 80° C., obtaining a residue of dried algal biomass.

The starting algal biomass, as well as the residue of dried algal biomass, were subjected to determination of the total lipids operating as described in Example 2: the results obtained are indicated in Table 2.

EXAMPLE 6

Lipid Extraction (Concentration of Dry Matter Equal to 20%, Solvent Xylene)

100 ml of xylene were added to a three-necked 500 ml flask, equipped with a Marcusson Dean-Stark distillation apparatus, containing 50 g of an aqueous suspension of algal biomass of algae of the strain *Scenedesmus* sp. obtained as described in Example 1, having a concentration of dry matter equal to 20% by weight with respect to the total weight of the aqueous suspension of algal biomass (ratio concentration of dry matter in the aqueous suspension of algal biomass:volume solvent equal to 1:10).

The flask, maintained at atmospheric pressure, was brought by means of a heating jacket to 92° C. (boiling point of the low-boiling azeotrope) and was kept, under stirring, at this temperature, for 2 hours.

After 2 hours, the stirring was stopped, the flask was brought back to room temperature (25° C.) and the two phases were left to separate by gravity.

The organic phase, about 100 ml, comprising xylene and lipids, was recovered by removing it directly from the flask.

The semisolid phase remaining in the flask was washed with xylene (100 ml) and dried in a thermostat-regulated oven at 80° C., obtaining a residue of dried algal biomass.

The starting algal biomass, as well as the residue of dried algal biomass, were subjected to determination of the total lipids operating as described in Example 2: the results obtained are indicated in Table 2.

EXAMPLE 7

Lipid Extraction (Concentration of Dry Matter Equal to 20%, Solvent Ethyl Acetate)

100 ml of ethyl acetate were added to a three-necked 500 ml flask, equipped with a Marcusson Dean-Stark distillation apparatus, containing 50 g of an aqueous suspension of algal biomass of algae of the strain *Scenedesmus* sp. obtained as described in Example 1, having a concentration of dry matter equal to 20% by weight with respect to the total weight of the aqueous suspension of algal biomass (ratio concentration of dry matter in the aqueous suspension of algal biomass:volume solvent equal to 1:10).

The flask, maintained at atmospheric pressure, was brought by means of a heating jacket to 70° C. (boiling point of the low-boiling azeotrope) and was kept, under stirring, at this temperature, for 2.5 hours.

After 2.5 hours, the stirring was stopped, the flask was brought back to room temperature (25° C.) and the two phases were left to separate by gravity.

The organic phase, about 100 ml, comprising ethyl acetate and lipids, was recovered by removing it directly from the flask.

The semisolid phase remaining in the flask was washed with ethyl acetate (100 ml) and dried in a thermostat-regulated oven at 80° C., obtaining a residue of dried algal biomass.

The starting algal biomass, as well as the residue of dried algal biomass, were subjected to determination of the total lipids operating as described in Example 2: the results obtained are indicated in Table 2.

TABLE 2

| EXAMPLE | A* TOTAL LIPIDS (%) | B** TOTAL LIPIDS (%) | LIPID EXTRACTION YIELD (%) |
|---|---|---|---|
| 2 | 22.4 | 6.7 | 70.1 |
| 3 | 22.4 | 8.3 | 62.9 |
| 4 | 22.4 | 8.2 | 63.4 |
| 5 | 22.4 | 5.3 | 76.3 |
| 6 | 22.4 | 5.0 | 77.7 |
| 7 | 22.4 | 2.5 | 88.8 |

A*: starting algal biomass;
B**: residue of dried algal biomass after lipid extraction

EXAMPLE 8

Preparation of the Algal Biomass

In the following examples 9-11, the algal strain *Chlorella* sp., of internal collection, which normally grows in salt water, was used. The cultivation process adopted is described hereunder.

The inoculum to be introduced into the growth tank described hereunder, was prepared as follows:
- a sample of monoalgal culture previously preserved at −85° C. in a 10% glycerine solution, was defrosted leaving it at room temperature, it was then subjected to centrifugation to remove the supernatant, obtaining a cellular paste;
- the cellular paste thus obtained was inoculated into three 250 ml flasks containing 50 ml of solution comprising nutrients, obtaining an algal culture;
- said algal culture was grown in an illuminated climatic chamber at a constant temperature of 30° C., in the presence of $CO_2$ at 0.5% in air;
- after about a week, the flask reached a concentration of 0.3 g/l, this culture was used as inoculum for three 1 liter flasks containing 500 ml of solution comprising nutrients and placed in the climatic chamber;
- after 2 days the culture had a concentration of 0.5 g/l and this culture was used as inoculum for a laboratory growth tank having a volume of 35 liters.

The inoculum, prepared as described above, was grown in the culture medium F/2, described in literature for the cultivation of microalgae. The growth conditions were the following:
Water: drinkable;
Seawater salts: 33 g/l
$NaNO_3$: 600 mg/1;
$NaH_2PO_4.H_2O$: 45 mg/l;
$FeCl_3.6H_2O$: 6.3 mg/l;
$Na_4EDTA$: 8.72 mg/l;
Vitamins: 0.2 mg/l of thiamine-HCl, 1.0 µg/l of biotin, 1.0 µg/l of vitamin B12;
Microelements: 0.0196 mg/l of $CuSO_4.5H_2O$, 0.044 mg/l of $ZnSO_4.7H_2O$, 0.020 mg/l of $CoCl_2.6H_2O$, 0.360 mg/l of $MnCl_2.4H_2O$, 0.0126 mg/l of $Na_2MoO_4.2H_2O$;
Operating pH: 7.8.
Inoculum tank: 10% by volume of the above culture in F/2 medium.

The tank was illuminated from the outside by means of 17,500 Lux tungsten lamps and was maintained at 28° C. by means of thermostat-regulated water circulation. The tank was also fed with a mixture of air and $CO_2$ at 10% in air, at a flow-rate of 200 liters/hour, under a pH control (pH set point 7.0).

F2 culture medium tank: the growth conditions are the same as those indicated for the growth of the inoculum.

When shifts of +0.2 units were observed with respect to pH 7.0, the $CO_2$ flow was manually modified.

The algal biomass obtained was centrifuged in a disk centrifuge of the Alfa Laval type obtaining an aqueous suspension of algal biomass having a volume of about 2 liters (concentration of dry matter 10 g/liter).

The aqueous suspension of algal biomass was then subjected to filtration under vacuum until a concentration of dry matter was obtained, varying from 5% by weight to 20% by weight with respect to the total weight of the aqueous suspension of algal biomass.

The samples obtained were preserved in a refrigerator before being subjected to lipid extraction.

EXAMPLE 9

Lipid Extraction (Concentration of Dry Matter Equal to 5%, Solvent n-Octane)

50 ml of n-octane were added to a three-necked 500 ml flask, equipped with a Marcusson Dean-Stark distillation apparatus, containing 100 g of an aqueous suspension of algal biomass of algae of the strain *Chlorella* sp. obtained as described in Example 8, having a concentration of dry matter equal to 5% by weight with respect to the total weight of the aqueous suspension of algal biomass (ratio concentration of dry matter in the aqueous suspension of algal biomass:volume solvent equal to 1:10).

The flask, maintained at atmospheric pressure, was brought by means of a heating jacket to 100° C. and was kept, under stirring, at this temperature for 3 hours.

After 3 hours, the stirring was stopped, the flask was brought back to room temperature (25° C.) and the two phases were left to separate by gravity.

The organic phase, about 50 ml, comprising n-octane and lipids, was recovered by removing it directly from the flask.

The semisolid phase remaining in the flask was washed with n-octane (50 ml) and dried in a thermostat-regulated oven at 80° C., obtaining a residue of dried algal biomass.

The starting algal biomass, as well as the residue of dried algal biomass, were subjected to determination of the total lipids operating as described in Example 2: the results obtained are indicated in Table 3.

EXAMPLE 10

Lipid Extraction (Concentration of Dry Matter Equal to 10%, Solvent n-Octane)

50 ml of n-octane were added to a three-necked 500 ml flask, equipped with a Marcusson Dean-Stark distillation apparatus, containing 50 g of an aqueous suspension of algal biomass of algae of the strain *Chlorella* sp. obtained as described in Example 8, having a concentration of dry matter equal to 10% by weight with respect to the total weight of the aqueous suspension of algal biomass (ratio concentration of dry matter in the aqueous suspension of algal biomass:volume solvent equal to 1:10).

The flask, maintained at atmospheric pressure, was brought by means of a heating jacket to 100° C. and was kept, under stirring, at this temperature, for 2.5 hours.

After 2.5 hours, the stirring was stopped, the flask was brought back to room temperature (25° C.) and the two phases were left to separate by gravity.

The organic phase, about 50 ml, comprising n-octane and lipids, was recovered by removing it directly from the flask.

The semisolid phase remaining in the flask was washed with n-octane (50 ml) and dried in a thermostat-regulated oven at 80° C., obtaining a residue of dried algal biomass.

The starting algal biomass, as well as the residue of dried algal biomass, were subjected to determination of the total lipids operating as described in Example 2: the results obtained are indicated in Table 3.

EXAMPLE 11

Lipid Extraction (Concentration of Dry Matter Equal to 20%, Solvent n-Octane)

100 ml of n-octane were added to a three-necked 500 ml flask, equipped with a Marcusson Dean-Stark distillation apparatus, containing 50 g of an aqueous suspension of algal biomass of algae of the strain *Chlorella* sp. obtained as described in Example 8, having a concentration of dry matter equal to 20% by weight with respect to the total weight of the aqueous suspension of algal biomass (ratio concentration of dry matter in the aqueous suspension of algal biomass:volume solvent equal to 1:10).

The flask, maintained at atmospheric pressure, was brought by means of a heating jacket to 100° C. and was kept, under stirring, at this temperature, for 3 hours.

After 3 hours, the stirring was stopped, the flask was brought back to room temperature (25° C.) and the two phases were left to separate by gravity.

The organic phase, about 100 ml, comprising n-octane and lipids, was recovered by removing it directly from the flask.

The semisolid phase remaining in the flask was washed with n-octane (100 ml) and dried in a thermostat-regulated oven at 100° C., obtaining a residue of dried algal biomass.

The starting algal biomass, as well as the residue of dried algal biomass, were subjected to determination of the total lipids operating as described in Example 2: the results obtained are indicated in Table 3.

TABLE 3

| EXAMPLE | A* TOTAL LIPIDS (%) | B** TOTAL LIPIDS (%) | LIPID EXTRACTION YIELD (%) |
|---|---|---|---|
| 9 | 22.3 | 6.2 | 72.2 |
| 10 | 22.3 | 8.2 | 63.2 |
| 11 | 22.3 | 7.9 | 64.6 |

A*: starting algal biomass;
B**: residue of dried algal biomass after lipid extraction

The invention claimed is:

1. A process for the extraction of lipid from algal biomass, said process consisting of:
    (a) producing an aqueous suspension of algal biomass;
    (b) adding to said aqueous suspension of algal biomass at least one organic solvent immiscible or substantially immiscible with water, to obtain an organic-aqueous mixture;
    (c) subjecting said organic-aqueous mixture to evaporation of water and lipid extraction, said evaporation of water and lipid extraction being carried out simultaneously, operating at a temperature such to obtain the substantial complete removal of the water from said organic-aqueous mixture, to obtain:
        (i) an organic phase comprising lipid and said organic solvent; and
        (ii) a semi-solid phase comprising a residue of said algal biomass,
    wherein a lipid extraction yield ranges from 62.9% to 88.8%.

2. The process according to claim 1, wherein the aqueous suspension of algal biomass is derived from the growth of unicellular algae (microalgae), carried out on wastewaters coming from industrial wastewaters.

3. The process according to claim 1 or 2, wherein, the aqueous suspension of algal biomass is subjected to thickening to obtain a higher concentration of dry matter in said algal biomass.

4. The process according to claim 1, wherein the aqueous suspension of algal biomass has a concentration of dry matter ranging from 2% by weight to 40% by weight with respect to the total weight of the aqueous suspension of algal biomass.

5. The process according to claim 4, wherein the aqueous suspension of algal biomass has a concentration of dry matter ranging from 4% by weight to 25% by weight with respect to the total weight of the aqueous suspension of algal biomass.

6. The process according to claim 1, wherein the organic solvent immiscible with water is one or more members selected from the group consisting of an aliphatic hydrocarbon having a boiling point higher than 100° C.; an aromatic hydrocarbon; a refinery cut comprising: (a) a mixture of aliphatic hydrocarbons having a boiling point higher than 100° C., (b) a mixture of aromatic hydrocarbons, or (c) a mixture of aliphatic and aromatic hydrocarbons.

7. The process according to claim 6, wherein the organic solvent immiscible in water is selected from the group consisting of n-octane, xylene, and a mixture thereof.

8. The process according to claim 1, wherein the organic solvent substantially immiscible with water is selected from the group consisting of an ester; a ketone having a boiling point higher than 100° C.; and a mixture thereof.

9. The process according to claim 8, wherein the organic solvent substantially immiscible with water is ethyl acetate.

10. The process according to claim 1, wherein the ratio between the concentration of dry matter in the aqueous suspension of algal biomass and the volume of organic solvent is from 1:1 to 1:80.

11. The process according to claim 10, wherein the ratio between the concentration of dry matter in the aqueous suspension of algal biomass and the volume of organic solvent is from 1:3 to 1:70.

12. The process according to claim 1, wherein the evaporation of water and the lipid extraction are carried out:
(1) under atmospheric pressure, at 100° C., if the boiling temperature of said organic solvent is higher than 100° C.; or,
(2) at the boiling temperature of the low boiling azeotrope, if said organic solvent forms a low boiling azeotrope with water.

13. The process according to claim 1, wherein the evaporation of water and lipid extraction are carried out for a time ranging from 30 minutes to 5 hours.

14. The process according to claim 13, wherein the evaporation of water and lipid extraction are carried out for a time ranging from 1.5 hours to 3.5 hours.

15. The process according to claim 1, wherein the organic phase (i) comprising lipid and organic solvent is subjected to evaporation in order to recover the organic solvent which is re-used in the above process and the lipid is extracted.

16. The process according to claim 15, wherein the lipid is subjected to esterification in the presence of an alcohol having from 1 to 4 carbon atoms and of an acid catalyst in order to produce glycerol and alkyl esters.

17. The process according to claim 15, wherein the lipid is subjected to hydrogenation/deoxygenation in presence of hydrogen and a catalyst, to obtain green diesel.

18. The process according to claim 1, wherein said organic phase (i) comprising lipid and organic solvent is directly subjected to esterification, or to hydrogenation/deoxygenation.

19. The process according to claim 1, wherein said semi-solid phase (ii) comprising a residue of the algal biomass is subjected to pyrolysis in order to obtain pyrolytic oils.

20. The process according to claim 1, wherein said semi-solid phase (ii) comprising a residue of the algal biomass, after removal of the organic solvent, is subjected to anaerobic digestion by micro-organisms in the absence of oxygen in order to obtain biogas.

* * * * *